United States Patent
Hagen et al.

(10) Patent No.: US 7,656,343 B1
(45) Date of Patent: Feb. 2, 2010

(54) SYSTEM AND METHOD FOR PROVIDING ENHANCED WEATHER HAZARD ALERTING FOR AIRCRAFT

(75) Inventors: Bo S. Hagen, Marion, IA (US); Terrence P. Wey, Cedar Rapids, IA (US); Charles J. Dickerson, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 277 days.

(21) Appl. No.: 11/900,076

(22) Filed: Sep. 10, 2007

(51) Int. Cl.
*G01S 13/95* (2006.01)
(52) U.S. Cl. .................................................. 342/26 B
(58) Field of Classification Search ................ 342/26 B
See application file for complete search history.

(56) References Cited

U.S. PATENT DOCUMENTS

| | | | | |
|---|---|---|---|---|
| 5,523,759 A * | 6/1996 | Gillberg et al. | ........... | 342/26 B |
| 5,907,568 A * | 5/1999 | Reitan, Jr. | ................ | 342/26 B |
| 5,936,552 A * | 8/1999 | Wichgers et al. | .......... | 342/26 B |
| 6,424,288 B1 * | 7/2002 | Woodell | ................... | 342/26 R |
| 6,828,922 B1 * | 12/2004 | Gremmert et al. | ......... | 342/26 B |
| 6,879,280 B1 * | 4/2005 | Bull et al. | ................. | 342/26 B |
| 7,109,912 B1 * | 9/2006 | Paramore et al. | .......... | 342/26 B |
| 7,109,913 B1 * | 9/2006 | Paramore et al. | .......... | 342/26 B |
| 7,161,525 B1 * | 1/2007 | Finley et al. | .............. | 342/26 R |
| 7,292,178 B1 * | 11/2007 | Woodell et al. | ........... | 342/26 B |
| 7,417,579 B1 * | 8/2008 | Woodell | ................... | 342/26 B |

\* cited by examiner

*Primary Examiner*—Dan Pihulic
(74) *Attorney, Agent, or Firm*—Matthew J. Evans; Daniel M. Barbieri

(57) ABSTRACT

The present invention is a method for providing hazard alerting for an aircraft via an airborne weather radar system. The method includes performing multiple weather radar scans at various tilt angles via the system and receiving radar returns via a receiver. The returns are stored in a memory of the system and merged with ground clutter suppression algorithms for eliminating ground returns from the stored returns and for creating a weather image based on remaining returns included in the stored returns. The image is provided via a weather radar display of the system, and includes an alert icon and an alert message when a hazard is present within an area proximal to the aircraft and is at or above a severity level threshold. The alert icon and alert message collectively indicate a type, severity level and location of the hazard in azimuth relative to a heading of the aircraft.

17 Claims, 5 Drawing Sheets

SYSTEM AND METHOD FOR PROVIDING ENHANCED WEATHER HAZARD ALERTING FOR AIRCRAFT

FIELD OF THE INVENTION

The present invention relates to the field of airborne weather radar systems and particularly to an airborne weather radar system and method for providing enhanced weather hazard alerting for aircraft.

BACKGROUND OF THE INVENTION

Airborne weather radar systems are often implemented by aircraft to apprise flight crews of potentially serious weather conditions which may be proximal to the aircraft. Such systems may be designed for providing some lead time to flight crews prior to the aircraft entering potentially serious weather areas, thereby allowing preventative action to be taken to divert the aircraft away from the serious weather areas.

One problem with existing airborne weather radar systems is that a number of them fail to display radar returns pertaining to all significant weather which may be located within the range capacity of the weather radar system. Further, although a number of current systems may display threatening weather, the display may be difficult to interpret due to ground clutter or false alerts caused by strong ground returns or point returns received by the system. Such systems have often placed a great burden on pilots/flight crew members by forcing them to manually adjust radar tilt settings in order to procure sufficient information for making an educated guess as to whether an alert was indeed triggered by hazardous weather or was triggered by the strong ground target/point target returns. Still further, a number of current systems may fail to provide adequate information to describe details about the potential weather hazards, rendering many of these systems as sub-par planning tools for flight crews.

Thus, it would be desirable to provide a navigation solution which addresses the problems associated with current solutions.

SUMMARY OF THE INVENTION

Accordingly, an embodiment of the present invention is directed to an airborne weather radar system for an aircraft, the system including: a transmitter/receiver configured for transmitting radar signals at various tilt angles and further configured for receiving radar returns responsive to the signals; a memory configured for being communicatively coupled with the transmitter/receiver, the memory being further configured for storing position information for the aircraft, storing the received radar returns, and storing ground clutter suppression algorithms; a processor configured for being communicatively coupled with the memory, the processor further configured for accessing and utilizing the aircraft position information, the received radar returns, and the ground clutter suppression algorithms for providing a weather image, wherein the processor is further configured for removing ground returns from the received radar returns and for providing the weather image based on remaining returns of the received radar returns; and a display configured for being communicatively coupled with the processor, the display being further configured for displaying the weather image, the weather image being output to the display by the processor, wherein the weather image includes an alert icon and an alert message when a hazard is present within a pre-determined area proximal to the aircraft and when the hazard is at least one of at a pre-determined severity level threshold and above a pre-determined severity level threshold, the alert icon and the alert message collectively configured for indicating a type of hazard, a severity level of the hazard and a location of the hazard in azimuth relative to a heading of the aircraft.

An additional embodiment of the present invention is directed to a method for providing hazard alerting for an aircraft via an airborne weather radar system, the method including: performing multiple weather radar scans at various tilt angles via the weather radar system; receiving radar returns responsive to the multiple weather radar scans via a receiver of the weather radar system; storing the received radar returns in a memory of the weather radar system; merging the stored radar returns with ground clutter suppression algorithms for eliminating ground returns from the stored radar returns and further for creating a weather image based on remaining returns included in the stored radar returns; and providing the weather image via a weather radar display of the weather radar system, the weather image including an alert icon and an alert message when a hazard is present within a predetermined area proximal to the aircraft and when the hazard is at least one of at a pre-determined severity level threshold and above a pre-determined severity level threshold, the alert icon and the alert message collectively configured for indicating a type of hazard, a severity level of the hazard and a location of the hazard in azimuth relative to a heading of the aircraft.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
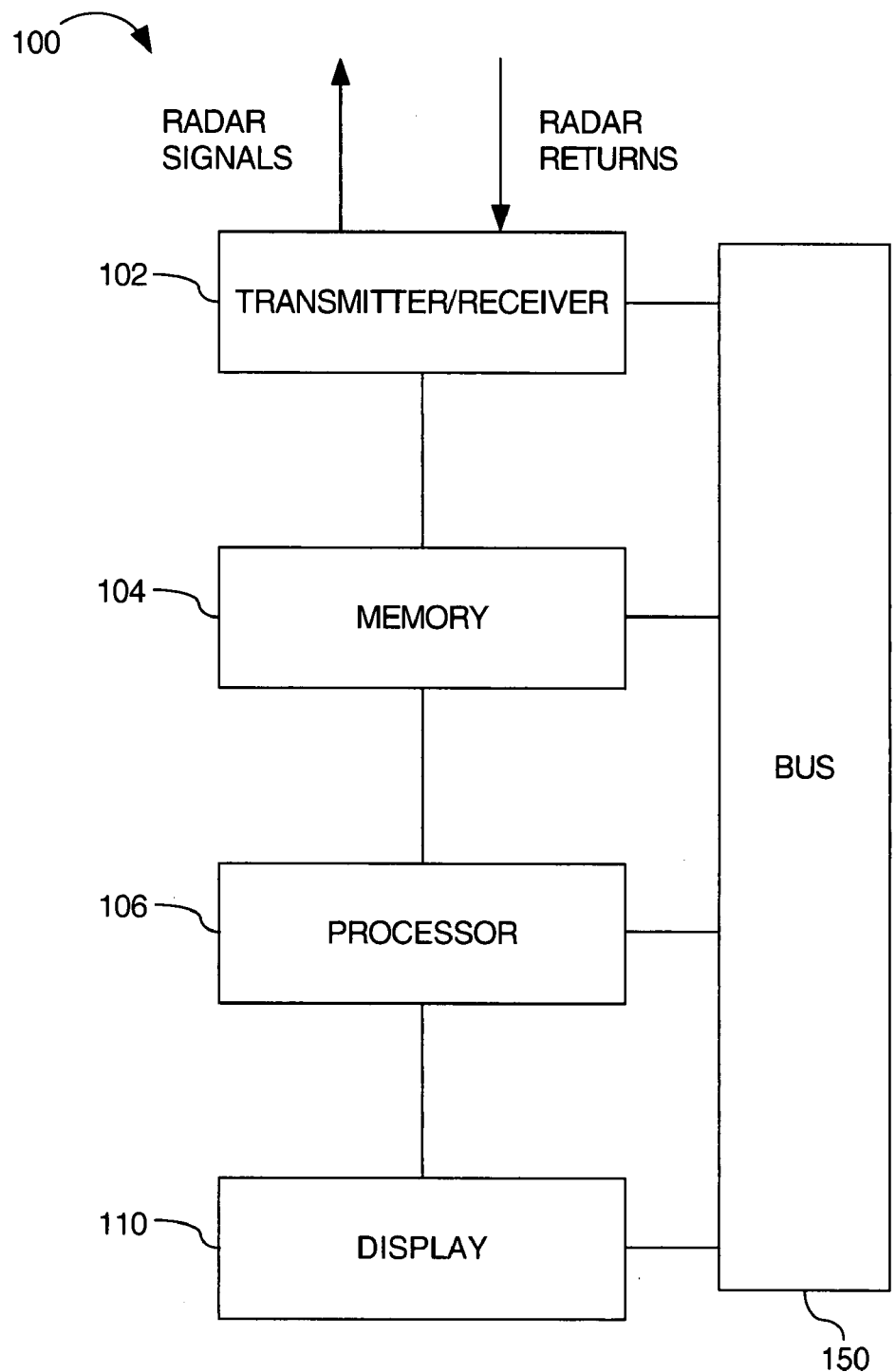
FIG. 1 is a block diagram schematic of an airborne weather radar system for an aircraft in accordance with an exemplary embodiment of the present invention.
Figure 2:
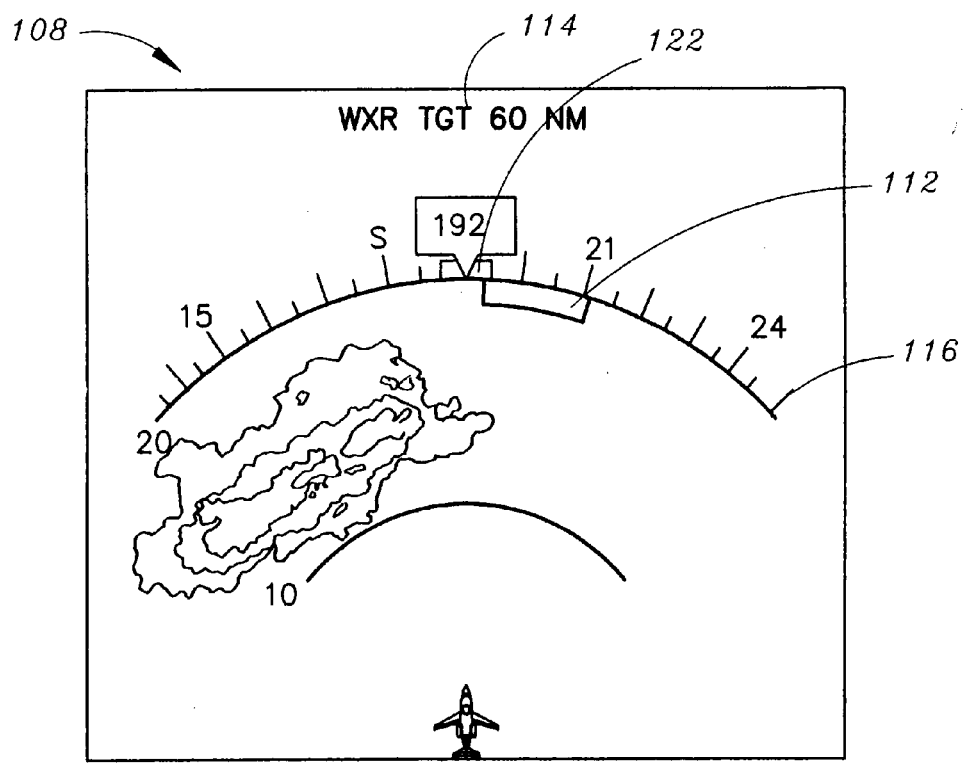
FIG. 2 is a weather image which may be displayed via a weather radar display of the system of the present invention, said weather image including an alert icon and an alert message, said alert icon and alert message indicating that a weather target is located beyond a selected range of the system and that said weather target is located to the right of the flight path of an aircraft implementing an exemplary embodiment of the system of the present invention.

FIG. 1 is a block diagram schematic of an airborne weather radar system in accordance with an exemplary embodiment of the present invention. In the illustrated embodiment, the system 100 includes a transmitter/receiver 102, which may be configured for transmitting radar signals at various tilt angles. The transmitter/receiver may be further configured for receiving radar returns responsive to the transmitted signals. For example, the system 100 may be a MultiScan™ weather radar system (ex—WXR-2100), such as produced by Rockwell Collins, Inc. of Cedar Rapids, Iowa.

In exemplary embodiments, the system 100 may further include a memory 104 configured for being communicatively coupled with the transmitter/receiver 102. The memory 104 may be further configured for storing position information for the aircraft, storing the received radar returns, and storing ground clutter suppression algorithms.

In further embodiments, the system 100 may further include a processor 106 configured for being communicatively coupled with the memory 104. The processor 106 may further be configured for accessing and utilizing the aircraft position information, the received radar returns, and the ground clutter suppression algorithms for providing a weather image 108. (as shown in FIGS. 2-6). In current embodiments of the present invention, the processor 106 may be configured for removing ground returns/ground target returns/point target returns from the received radar returns and for providing the weather image 108 based on the remaining received radar returns (ex—received radar returns minus ground returns). Such functionality allows the system 100 to provide a reduced ground clutter and/or ground-clutter free weather image in an automated manner.

In exemplary embodiments, the system 100 may further include a display 110 configured for being communicatively coupled with the processor 106. Further, the display 110 may be configured for displaying the weather image 108, said weather image being output to the display 110 by the processor 106. In current embodiments, one or more of the transmitter/receiver 102, the memory 104, the processor 106 and/or the display 110 may be communicatively coupled via a bus 150. (as shown in FIG. 1).

Referring generally to FIGS. 2 through 6, in current embodiments of the present invention, the weather image 108 includes an alert/Enhanced Weather Hazard Alert (EWHA) icon 112 and an alert/EWHA message 114 when a hazard is present within a pre-determined area proximal to the aircraft and when the hazard (ex—a weather cell) is at or above a pre-determined severity level threshold. For instance, the hazard may be a weather target (such as thunderstorms, lightning, hail or the like) or the hazard may be a turbulence target. Further, the alert icon 112 and alert message 114 may only be displayed when a hazard is within a pre-determined area proximal to the aircraft, such as at or within a maximum detection range (ex—320 nautical miles (nm), or greater, depending on future radar system capability) of the aircraft's radar system 100 and/or at or within perimeter(s) of the scanning area/scanning cone of the radar system 100. Still further, the pre-determined severity level threshold might be such that the alert icon and alert message are displayed only when moderate to severe hazards are included in the weather image, thereby allowing flight crews to be apprised of only significant weather which may be in proximity to the aircraft implementing the system. Further, the system 100 is configured for removing the alert icon 112 and the alert message 114 from the weather image 108 when no hazard within the predetermined area proximal to the aircraft is at or above the pre-determined severity level threshold, or when all hazards at or above the pre-determined severity level threshold are located outside of and/or have moved outside of the scanning area/scanning cone of the radar system 100.

In exemplary embodiments, the alert icon 112 may be configured for indicating a type of hazard. For example, the alert icon 112 may be a box-shaped indicator which appears proximal to an outer edge of the weather image 108 shown on the display 110, such as on or proximal to a compass rose 116 (as shown in FIGS. 2-6). Further, the alert icon 112 may be displayed as having a certain color to indicate the type and/or the severity level of the hazard being indicated. For instance, the alert icon 112 may be displayed as a yellow indicator when indicating moderate weather targets, as a red indicator when indicating severe weather targets, and as a magenta indicator when indicating turbulence targets. In further embodiments, the alert icon 112 may be displayed as one of a multi-color indicator, a multi-portion indicator and multiple indicators when indicating the presence of a weather target and a turbulence target. For example, the alert icon 112 may have a first portion 118, such as a red portion, to indicate a severe weather target and a second portion 120, such as a magenta portion, to indicate a turbulence target. In additional embodiments, the alert icon 112 may be configured for indicating a location of the hazard in azimuth relative to a heading of the aircraft. For instance, the alert icon 112 may be positioned along the compass rose 116 to the left or right (see FIG. 2) of a heading/flight path indicator 122, to reflect the degree of variance (such as +/−10 degrees) in the location of the hazard in azimuth relative to the heading of the aircraft. Alternatively, the alert icon 112 may be positioned so as to be generally aligned with the heading/flight path indicator 122 (see FIG. 3 and FIG. 5) to indicate that the hazard is in the flight path of the aircraft, such as in embodiments in which a flight plan is provided.

In current embodiments of the present invention, the alert message 114 may be configured for providing detailed information about the hazard. For example, the alert message 114 may be a textual representation and/or a graphical representation for providing information about the type of hazard. In exemplary embodiments, the alert message 114 may be displayed conspicuously in the weather image, such as proximal to a top edge of the weather image 108. For instance, to indicate that the hazard is a weather target, the alert message 114 may read "WXR TGT" (see FIG. 2), further, to indicate that the hazard is a turbulence target, the alert message 114 may read "Turb" (see FIG. 5) and finally, to indicate that the hazard is both a weather target and a turbulence target, the alert message 114 may read "WXR/T TGT" (see FIG. 4).

Further, the alert message 114 may be displayed as having a certain color to indicate the type and/or the severity level of the hazard being indicated. For instance, the alert message 114 may be displayed as yellow graphics/text when indicating moderate weather targets, as red graphics/text when indicating severe weather targets, and as magenta graphics/text when indicating turbulence targets. In additional embodiments, the alert message 114 may be configured for indicating a distance of the aircraft from the hazard. For example, the alert message 114 may read "60 nm" (see FIG. 2) to indicate that a hazard is in or proximal to the flight path of the aircraft at a location 60 nautical miles (nm) ahead of the aircraft.

In an exemplary embodiment, the system 100 may be configured for displaying the alert icon 112 and the alert message 114 via the weather radar display 110 when the hazard is located beyond a selected range of the weather radar system 100. For instance, if the selected range (ex—range entered by the flight crew) is twenty (20) nautical miles (nm), (such as is the case in FIGS. 2-4), the system 100 of the present invention may display the alert icon and/or alert message to indicate the presence of a hazard which is located beyond the selected range. For example, in FIG. 2, even though the selected range is 20 nm, the alert message provided is indicating the presence of a hazard beyond the selected range (20 nm) and at an estimated distance which is proximal to sixty (60) nautical miles (nm) from the aircraft. Further, the system 100 of the present invention may be configured for displaying the alert icon 112 and the alert message 114 when the hazard is located beyond a selected range, but not beyond the maximum detection range (ex—320 nm) of the weather radar system.

In further embodiments, the system 100 may be configured for displaying the alert icon 112 and the alert message 114 via the weather radar display 110 when the hazard is located at or within a selected range. For example, if the system 100 is in "long range scan mode", wherein the selected range is at or above a threshold level, or at a maximum detection range (ex—320 nm) of the radar system 100, the alert icon 112 and the alert message 114 may be provided for indicating or alerting of the presence of a hazard located at or within the selected range. This capability is advantageous in that, a number of weather systems, when in "long range scan mode" often fail to clearly display hazards which are in close proximity to the aircraft. For instance, in FIG. 5, the selected range of the weather radar system 100 is 320 nm and the alert message 112 and alert icon 114 are displayed to indicate that there is a turbulence target in relatively close proximity to the aircraft (ex—20 nm ahead of the aircraft and within the flight path of the aircraft).

Figure 6:
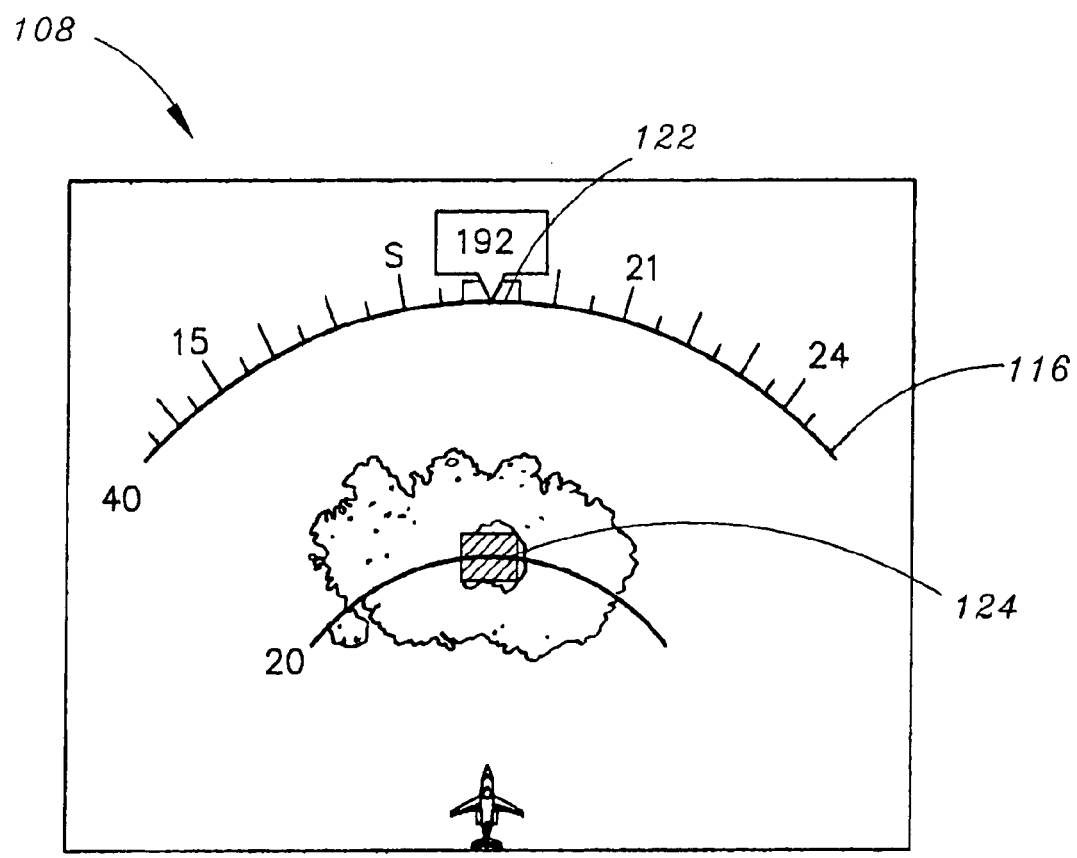
FIG. 6 is a weather image which may be displayed via a weather radar display of the system of the present invention, said weather image including a target indicator, said target indicator indicating a spatial location of a hazard (exs.— weather target, turbulence target) that is located in the flight path of an aircraft implementing an exemplary embodiment of the system of the present invention.

Alternatively, when the system 100 is not in "long range scan mode" (ex—when the selected range is below the threshold range), and, when the hazard is located within the selected range (where the hazard may be clearly displayed), the system 100 may be configured for removing the alert icon 112 and the alert message 114 from the weather image 108. (See FIG. 6). In additional embodiments, when the system 100 is not in "long range scan mode" (ex—when the selected range is below the threshold range), and, when a hazard is located within the selected range (where the hazard may be clearly displayed), the system 100 may be further configured for providing a target indicator 124 in the weather image 108, the target indicator 124 configured for indicating a spatial location of the hazard (ex—weather target or turbulence target). For instance, the target indicator 124 may be a rectangular box (as shown in FIG. 6), having a distinguishing color, pattern, cross-hatching, hash marking or the like and being positioned around/over the hazard on the weather image 108 to clearly demarcate the spatial location of the hazard on the weather image 108. Further, the selected range where hazards located within which may be clearly displayed (ex—the threshold range), may be dependent on the size of the hazard.

Figure 3:
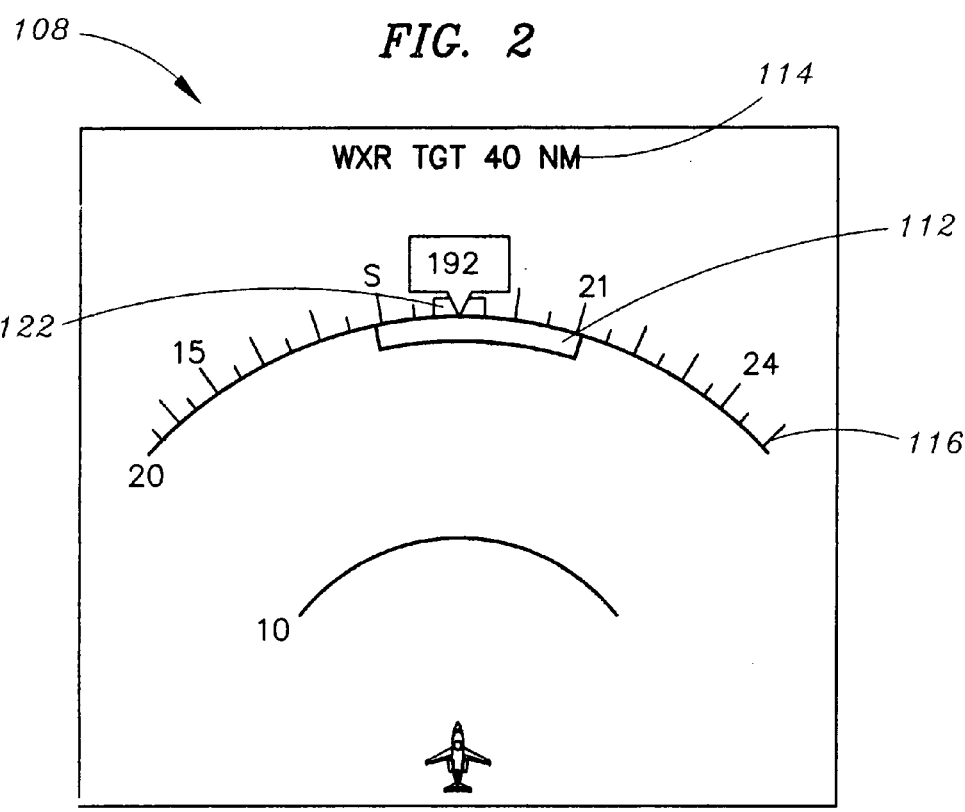
FIG. 3 is a weather image which may be displayed via a weather radar display of the system of the present invention, said weather image including an alert icon and an alert message, said alert icon and alert message indicating that a weather target is located beyond a selected range of the system and that said weather target is in the flight path of an aircraft implementing an exemplary embodiment of the system of the present invention.
Figure 4:
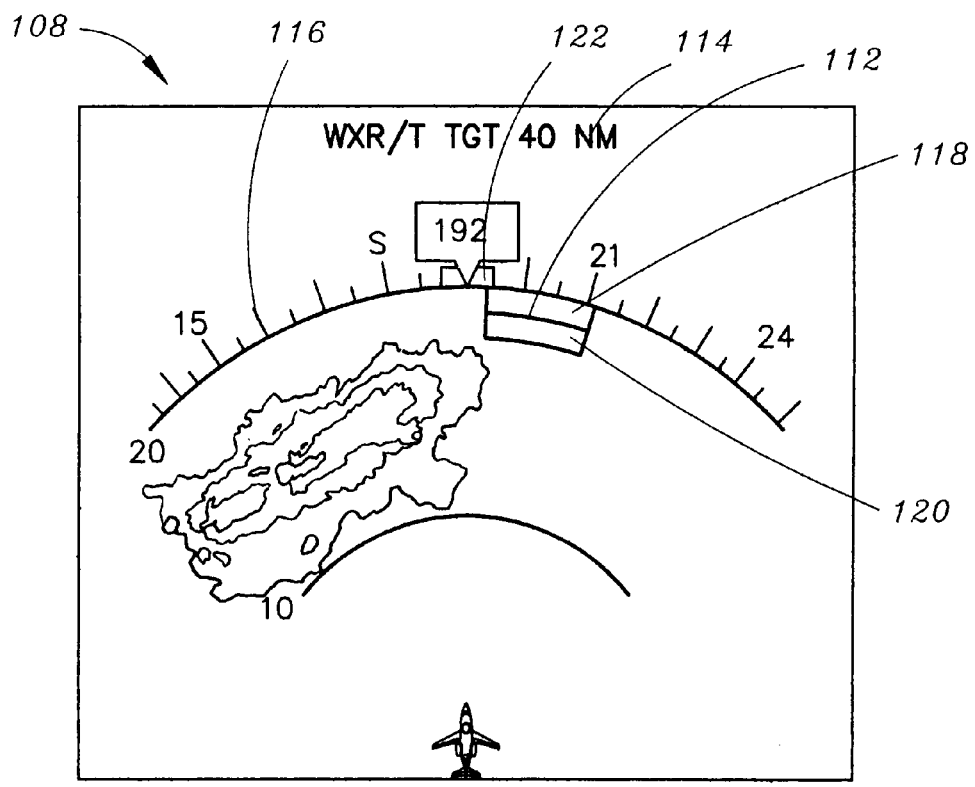
FIG. 4 is a weather image which may be displayed via a weather radar display of the system of the present invention, said weather image including an alert icon and an alert message, said alert icon and alert message indicating that a weather target and a turbulence target are located beyond a selected range of the system and that said weather target and turbulence target are located to the right of the flight path of an aircraft implementing an exemplary embodiment of the system of the present invention.
Figure 5:
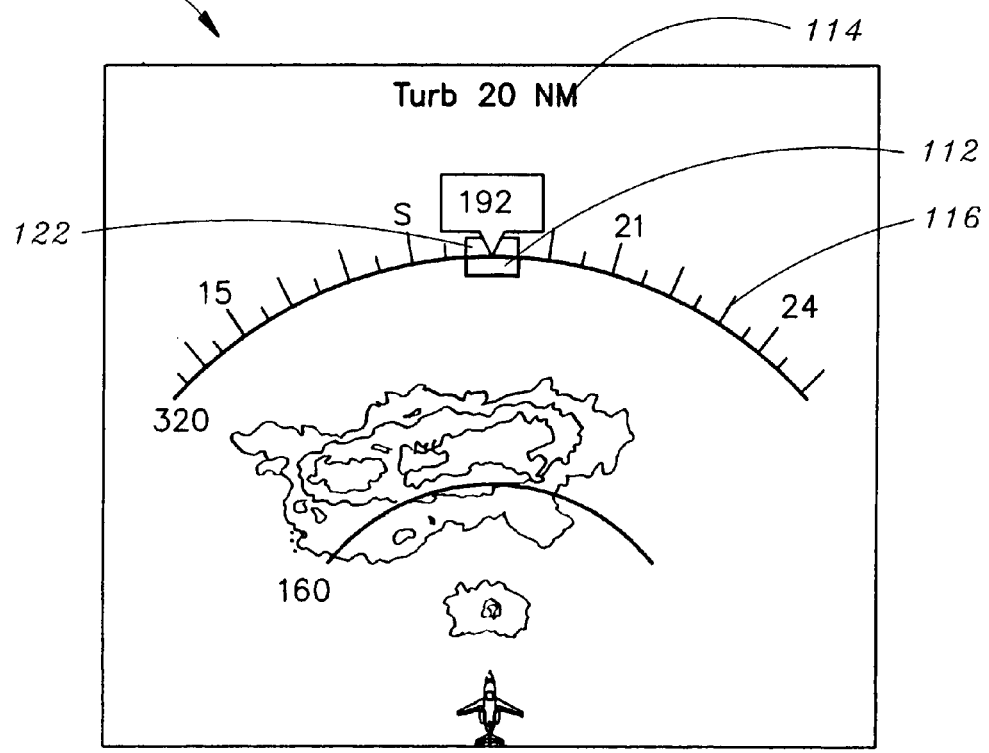
FIG. 5 is a weather image which may be displayed via a weather radar display of the system of the present invention, said weather image including an alert icon and alert message, said alert icon and alert message indicating that a turbulence target is located within a selected range of the system, the selected range being a long range (ex—320 nautical miles), and further indicating that said turbulence target is located in the flight path of an aircraft implementing an exemplary embodiment of the system of the present invention.

In further embodiments, the alert icon 112 may be configured for providing information about the size of the hazard (ex—weather cell). For instance, FIGS. 2 and 3 each show an alert icon 112, however, the alert icon in FIG. 3 is larger than the alert icon shown in FIG. 2, indicating that the hazard being warned of in FIG. 3 is larger than the hazard being warned of in FIG. 2.

In alternative embodiments, an estimated range/distance between the aircraft and a hazard (ex—weather target) may be provided via a navigation display or a primary flight display if the weather radar system 100 is not selected, or is in standby mode.

In exemplary embodiments, the alert icon 112 and alert message 114 will be provided for hazards based on a priority scale. For example, when multiple hazards are present, the alert icon 112 and alert message 114 will be provided for the hazard which presents the most imminent or severe threat to the aircraft.

In additional embodiments, the system 100 may be configured for providing aural alerts to a flight crew to indicate the presence of hazards detected within, along or proximal to the flight path of the aircraft.

In embodiments in which the radar system 100 is configured for detecting storm tops and/or storm growth/decay, the alerting function (ex—alert icon 112 and alert message 114) may be provided for indicating/warning about a storm cell which may become a threat as the aircraft approaches. Further, such a system 100 may be further configured for promoting alerting efficiency by only alerting on weather which is within a crew selected altitude range of the aircraft (ex—+/−5,000 feet). In additional embodiments, alerting/alerting function may be enabled/disabled, such as automatically by the system 100 or manually by a flight crew. For example, the alerting function may be automatically enabled when Standby Mode is the selected mode of the system 100. Further, the alerting function may be automatically enabled when Auto Mode is the selected mode of the system 100. Still further, the alerting function may be automatically enabled when the aircraft is located at least at a certain height above ground level (AGL), such as 2,000 feet or more AGL. In exemplary embodiments, the alerting function may be automatically disabled when Manual Mode is the selected mode of the system. Further, the alerting function may be automatically disabled below the certain height above ground level (AGL), (ex—2,000 feet AGL), for reducing pilot workload. For example, disabling alerts below 2,000 feet AGL, may promote reduced interference with windshear alerts for an aircraft equipped with such functionality.

In embodiments in which the aircraft is equipped with a lightning detector device configured for detecting both cloud-to-ground and cloud-to-cloud strikes, the system 100 of the present invention may be configured for providing enhanced severity alerts, such as for weather, turbulence, hail prediction, etc.

Figure 7:
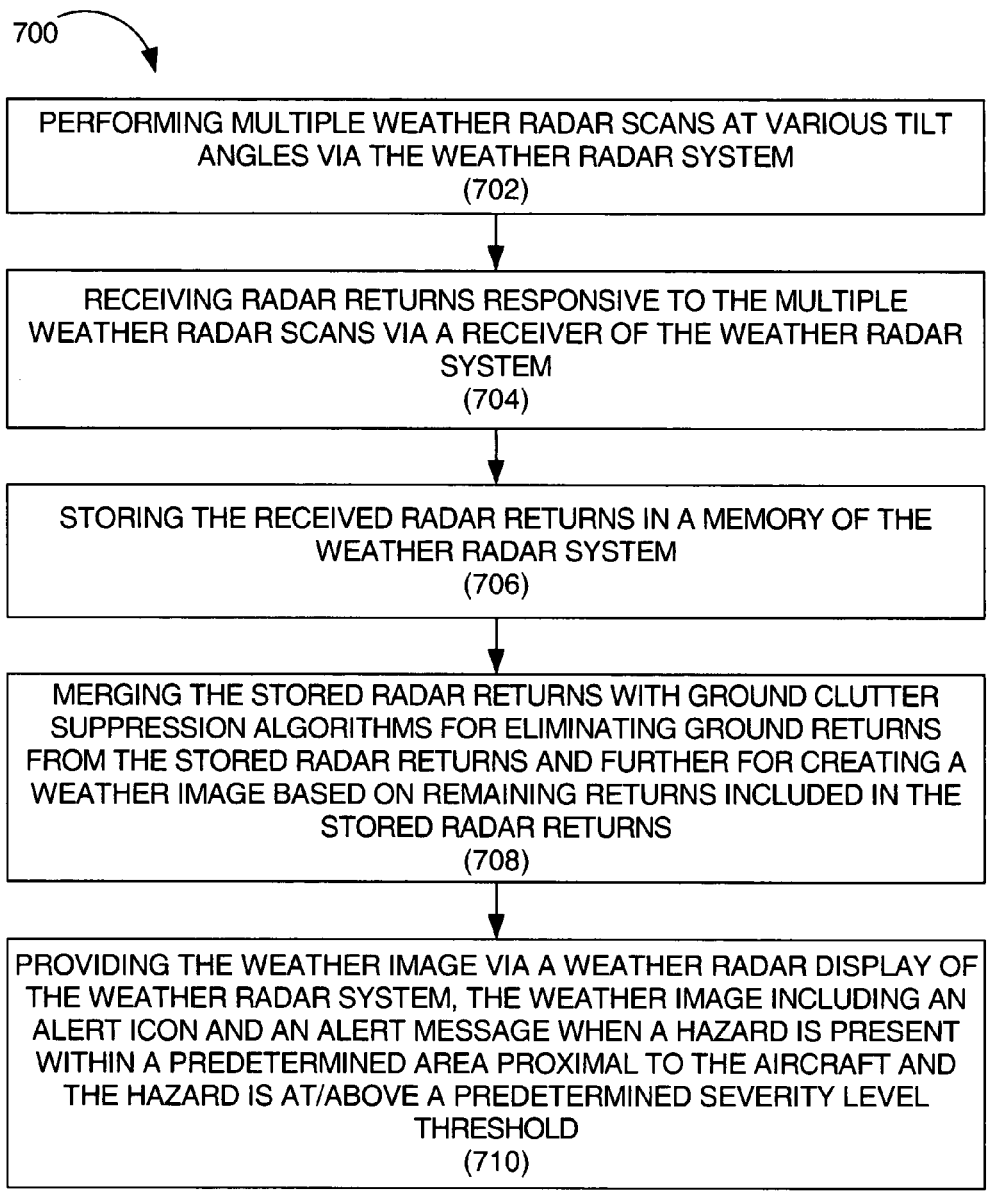
FIG. 7 is a flowchart illustrating a method for providing hazard alerting for an aircraft via an airborne weather radar system in accordance with exemplary embodiments of the present invention.

FIG. 7 illustrates a method for providing hazard alerting for an aircraft via an airborne weather radar system, the method 700 may include the step of performing multiple weather radar scans at various tilt angles via the weather radar system 702. The method 700 may further include the step of receiving radar returns responsive to the multiple weather radar scans via a receiver of the weather radar system 704. The method 700 may further include storing the received radar returns in a memory of the weather radar system 706. The method 700 may further include merging the stored radar returns with ground clutter suppression algorithms for eliminating ground returns from the stored radar returns and further for creating a weather image based on remaining returns included in the stored radar returns 708. Such functionality may promote the reduction of false alerts, such as those caused by ground returns. The method 700 may further include providing the weather image via a weather radar display of the weather radar system 710. In exemplary embodiments, the weather image includes an alert icon and an alert message when a hazard is present within a predetermined area proximal to the aircraft and when the hazard is at least one of at a pre-determined severity level threshold and above a pre-determined severity level threshold.

In current embodiments of the present invention, the alert icon and the alert message are collectively configured for indicating a type of hazard, a severity level of the hazard and a location of the hazard in azimuth relative to a heading of the aircraft. In further embodiments, the hazard may be at least one of a weather target and a turbulence target. In exemplary embodiments, the alert message is configured for providing at least one of a textual indication and a graphical indication of at least one of a type of hazard and a distance between the hazard and the aircraft.

In exemplary embodiments, the method 700 further includes displaying the alert icon and the alert message via the weather radar display when the hazard is located beyond a selected range of the weather radar system, but is also located at least one of at a maximum detection range of the weather radar system and within the maximum detection range of the weather radar system, the selected range being less than the maximum detection range of the weather radar system 712. In additional embodiments, the method 700 further includes displaying the alert icon and the alert message via the weather radar display when the hazard is located at least one of at the selected range and within the selected range 714. For example, the selected range may be at least one of at a threshold level, above the threshold level and at the maximum detection range.

In current embodiments of the present invention, the method 700 further includes removing the alert icon and the alert message from the weather image when the hazard is located within the selected range of the weather radar system and the selected range is at least one of at a threshold level and below the threshold level 716. In additional embodiments, the method 700 further includes providing a target indicator in the weather image which indicates a spatial location of the hazard 718.

In exemplary embodiments, the method 700 further includes removing the alert icon and the alert message from the weather image when no hazard within the predetermined area proximal to the aircraft is at least one of at the pre-determined severity level threshold and above the pre-determined severity level threshold 720. The method 700 further includes displaying the alert icon and the alert message when the weather radar system is not in a selected mode 722.

The EWHA alerting function/functionality provided by the above-described system 100 may allow aircraft to avoid penetrating potentially damaging weather cells/turbulence by allowing a flight crew for the aircraft to plan around these cells at an early stage (ex—make corrections to the aircraft's flight path). Such capability may further allow for minimized fuel consumption and may promote minimal passenger discomfort.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An airborne weather radar system for an aircraft, comprising:
a transmitter/receiver configured for transmitting radar signals at various tilt angles and further configured for receiving radar returns responsive to the signals;
a memory configured for being communicatively coupled with the transmitter/receiver and further configured for storing position information for the aircraft, storing the received radar returns, and storing ground clutter suppression algorithms;
a processor configured for being communicatively coupled with the memory, the processor further configured for accessing and utilizing the aircraft position information, the received radar returns, and the ground clutter suppression algorithms for providing a weather image, wherein the processor is further configured for removing ground returns from the received radar returns and for providing the weather image based on remaining returns of the received radar returns; and a display configured for being communicatively coupled with the processor, the display being further configured for displaying the weather image, the weather image being output to the display by the processor, wherein the weather image includes an alert icon and an alert message when a hazard is present within a pre-determined area proximal to the aircraft and when the hazard is at least one of at a pre-determined severity level threshold and above a pre-determined severity level threshold, the alert icon and the alert message collectively configured for indicating a type of hazard, a severity level of the hazard and a location of the hazard in azimuth relative to a heading of the aircraft, the system being configured for displaying the alert icon and the alert message via the weather radar display when the hazard is located beyond a selected range of the weather radar system, but is also located at least one of at a maximum detection range of the weather radar system and within the maximum detection range of the weather radar system, the selected range being less than the maximum detection range of the weather radar system.

2. A system as claimed in claim 1, wherein the hazard is at least one of a weather target and a turbulence target.

3. A system as claimed in claim 1, wherein the system is configured for displaying the alert icon and the alert message via the weather radar display when the hazard is located at least one of at a selected range and within a selected range, the selected range being at least one of at a threshold level, above the threshold level and at a maximum detection range.

4. A system as claimed in claim 1, wherein the system is configured for removing the alert icon and the alert message from the weather image when the hazard is located within a selected range of the weather radar system and the selected range is at least one of at a threshold level and below the threshold level and is further configured for providing a target indicator in the weather image, the target indicator configured for indicating a spatial location of the hazard.

5. A system as claimed in claim 1, wherein the system is configured for removing the alert icon and the alert message from the weather image when no hazard within the predetermined area proximal to the aircraft is at least one of at the pre-determined severity level threshold and above the pre-determined severity level threshold.

6. A method for providing hazard alerting for an aircraft via an airborne weather radar system, the method comprising:
  performing multiple weather radar scans at various tilt angles via the weather radar system;
  receiving radar returns responsive to the multiple weather radar scans via a receiver of the weather radar system;
  storing the received radar returns in a memory of the weather radar system;
  merging the stored radar returns with ground clutter suppression algorithms for eliminating ground returns from the stored radar returns and further for creating a weather image based on remaining returns included in the stored radar returns;
  providing the weather image via a weather radar display of the weather radar system, the weather image including an alert icon and an alert message when a hazard is present within a predetermined area proximal to the aircraft and when the hazard is at least one of at a pre-determined severity level threshold and above a pre-determined severity level threshold, the alert icon and the alert message collectively configured for indicating a type of hazard, a severity level of the hazard and a location of the hazard in azimuth relative to a heading of the aircraft; and
  displaying the alert icon and the alert message via the weather radar display when the hazard is located beyond a selected range of the weather radar system but is also located at least one of at a maximum detection range of the weather, radar system and within the maximum detection range of the weather radar system, the selected range being less than the maximum detection range of the weather radar system.

7. A method as claimed in claim 6, further comprising:
  displaying the alert icon and the alert message via the weather radar display when the hazard is located at least one of at a selected range and within a selected range, the selected range being at least one of at a threshold level, above the threshold level and at the maximum detection range.

8. A method as claimed in claim 6, further comprising:
  removing the alert icon and the alert message from the weather image when the hazard is located within a selected range of the weather radar system and the selected range is at least one of at a threshold level and below the threshold level; and
  providing a target indicator in the weather image which indicates a spatial location of the hazard.

9. A method as claimed in claim 6, further comprising:
  removing the alert icon and the alert message from the weather image when no hazard within the predetermined area proximal to the aircraft is at least one of at the pre-determined severity level threshold and above the pre-determined severity level threshold.

10. A method as claimed in claim 6, further comprising:
  displaying the alert icon and the alert message when the weather radar system is not in a selected mode.

11. A method as claimed in claim 6, wherein the alert message is configured for providing at least one of a textual indication and a graphical indication of at least one of a type of hazard and a distance between the hazard and the aircraft.

12. A method as claimed in claim 6, wherein the hazard is at least one of: a weather target and a turbulence target.

13. A computer-readable medium having computer-executable instructions for performing a method for providing hazard alerting for an aircraft, said method comprising:
  performing multiple weather radar scans at various tilt angles via the weather radar system;
  receiving radar returns responsive to the multiple weather radar scans via a receiver of the weather radar system;
  storing the received radar returns in a memory of the weather radar system;
  merging the stored radar returns with ground clutter suppression algorithms for eliminating ground returns from the stored radar returns and further for creating a weather image based on remaining returns included in the stored radar returns;
  providing the weather image via a weather radar display of the weather radar system, the weather image including an alert icon and an alert message when a hazard is present within a predetermined area proximal to the aircraft and when the hazard is at least one of at a pre-determined severity level threshold and above a pre-determined severity level threshold, the alert icon and the alert message collectively configured for indicating a type of hazard, a size of hazard, a severity level of the hazard, a distance between the hazard and the aircraft and a location of the hazard in azimuth relative to a heading of the aircraft
  displaying the alert icon and the alert message via the weather radar display when the hazard is located beyond a selected range of the weather radar system, but is also located at least one of at a maximum detection range of the weather radar system and within the maximum detection range of the weather radar system, the selected range being less than the maximum detection range of the weather radar system.

14. A computer-readable medium having computer-executable instructions for performing a method as claimed in claim 13, the method further comprising:
displaying the alert icon and the alert message via the weather radar display when the hazard is located at least one of at a selected range and within a selected range, the selected range being at least one of at a threshold level, above the threshold level and at the maximum detection range.

15. A computer-readable medium having computer-executable instructions for performing a method as claimed in claim 13, the method further comprising:
removing the alert icon and the alert message from the weather image when the hazard is located within a selected range of the weather radar system and the selected range is at least one of at a threshold level and below the threshold level; and
providing a target indicator in the weather image, the target indicator configured for indicating a spatial location of the hazard.

16. A computer-readable medium having computer-executable instructions for performing a method as claimed in claim 13, the method further comprising:
removing the alert icon and the alert message from the weather image when no hazard within the predetermined area proximal to the aircraft is at least one of at the pre-determined severity level threshold and above the pre-determined severity level threshold.

17. A computer-readable medium having computer-executable instructions for performing a method as claimed in claim 13, the method further comprising: displaying the alert icon and the alert message when the weather radar system is not in a selected mode.

* * * * *